Figure 1:
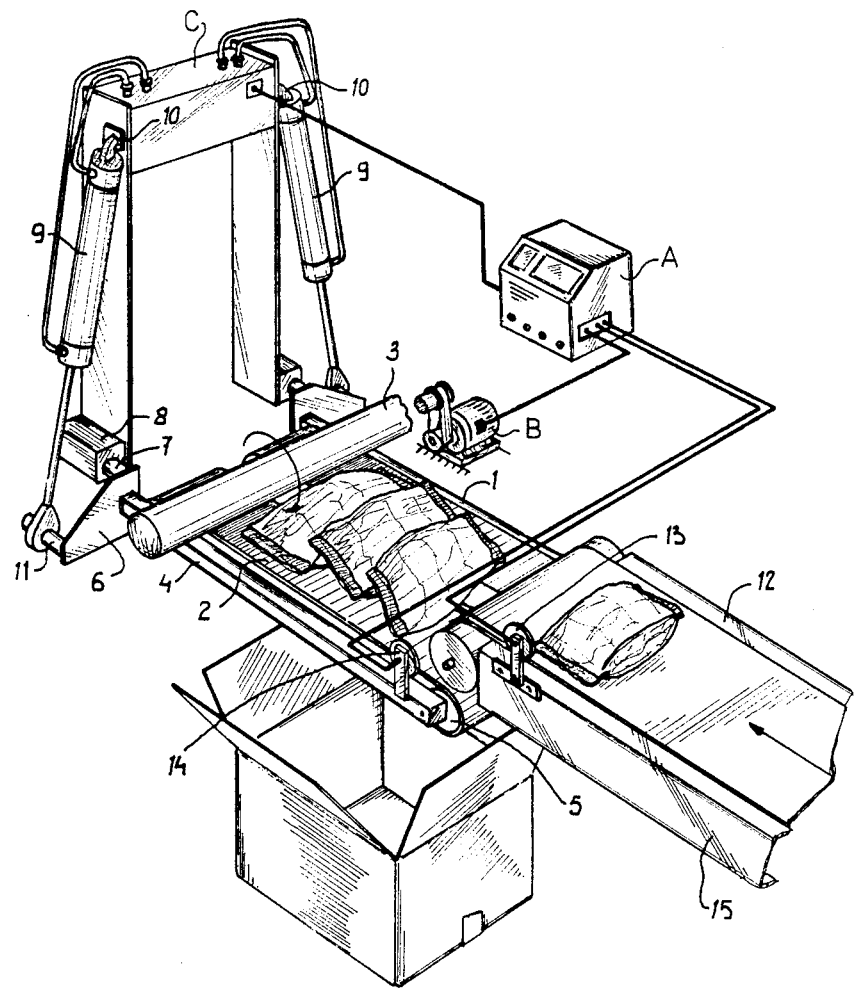

United States Patent [19]

Prakken

[11] Patent Number: 4,984,677
[45] Date of Patent: Jan. 15, 1991

[54] DEVICE FOR TRANSFERRING OBJECTS FROM A CONVEYOR TO A COLLECTION DEVICE

[76] Inventor: Bouwe Prakken, Spijkerlaan 9, 3471 Eg Kamerik, Netherlands

[21] Appl. No.: 465,954

[22] Filed: Jan. 16, 1990

[30] Foreign Application Priority Data

Jan. 31, 1989 [NL] Netherlands .......................... 8900234

[51] Int. Cl.$^5$ ..................... B65G 47/30; B65B 5/10; B65B 35/44; B65B 57/14
[52] U.S. Cl. ................................. 198/418.6; 198/835; 53/245; 53/498; 53/535; 271/202; 271/151; 414/793.5; 414/794; 414/794.2; 414/794.4
[58] Field of Search .................. 53/245, 247, 260, 498, 53/500, 531, 535, 537, 540, 542; 198/418.6, 835; 271/202, 151; 414/793.5, 794, 794.2, 794.4

[56] References Cited

U.S. PATENT DOCUMENTS

| | | | |
|---|---|---|---|
| 2,583,471 | 1/1952 | Collis | 198/835 |
| 2,759,596 | 8/1956 | Keller | 198/835 X |
| 3,312,357 | 4/1967 | Stephens et al. | |
| 3,520,396 | 7/1970 | Lingg | 198/418.6 |
| 3,587,688 | 6/1971 | Toby | 53/500 X |
| 3,593,860 | 7/1971 | Brenner | 414/793.5 |
| 3,848,725 | 11/1974 | Toby | 414/794 X |
| 4,611,458 | 9/1986 | Prakken | 53/537 |

FOREIGN PATENT DOCUMENTS

| | | |
|---|---|---|
| 0269495 | 6/1988 | European Pat. Off. |
| 2346259 | 10/1977 | France |
| 2540845 | 8/1984 | France |

Primary Examiner—Robert L. Spruill
Assistant Examiner—Beth Bianca
Attorney, Agent, or Firm—Young & Thompson

[57] ABSTRACT

A device for transferring objects, such as filled bags, from a conveyor to a collection device, such as a box, placed below the conveyor comprises two conveyor belts (1, 2) placed adjacent to each other. In the conveying position, the top parts of said conveyor belts together form one conveying face. Each of the conveyor belts (1, 2) is disposed on a tiltable frame (4). In order to make the drive of the conveyor belts (1, 2) extremely simple and to make it possible to adjust the conveyor belts at right angles to their direction of conveyance, the drive comprises a drive pulley (3) acting upon the top part of the belts (1, 2) in the conveying position thereof.

4 Claims, 2 Drawing Sheets

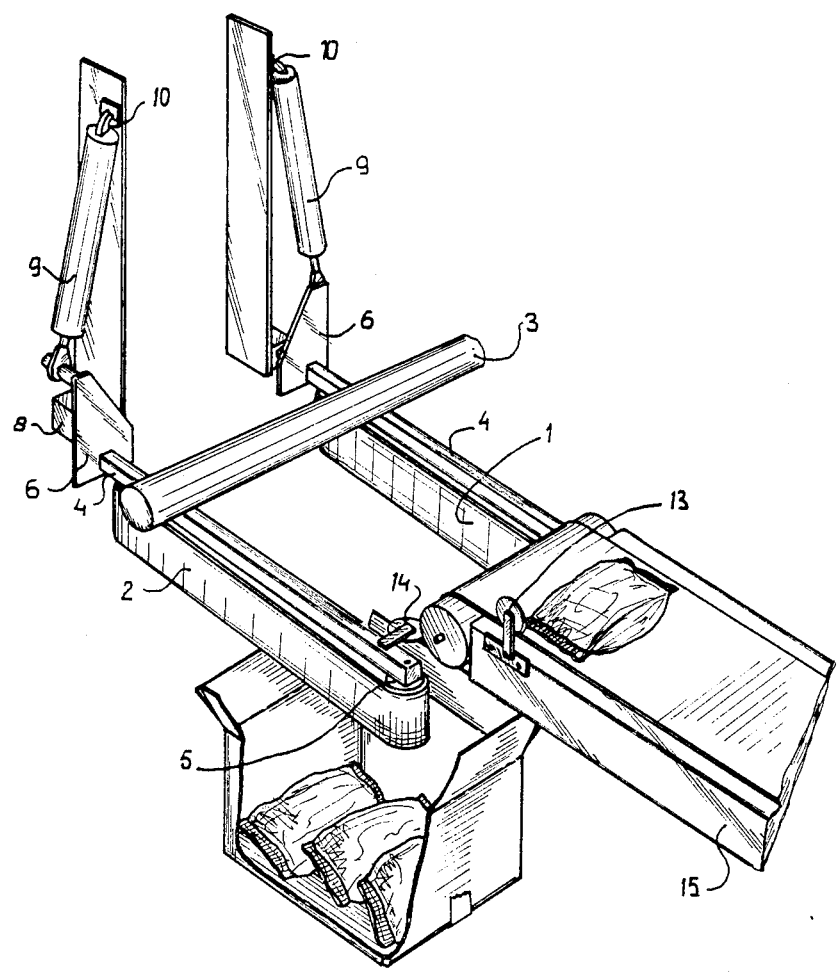

DEVICE FOR TRANSFERRING OBJECTS FROM A CONVEYOR TO A COLLECTION DEVICE

The invention relates to a device for transferring objects, such as filled bags, from a conveyor to a collection device, such as a box, placed below said conveyor, said conveyor comprising two conveyor belts disposed next to each other and in the conveying position forming one conveyor face, while each of said conveyor belts is disposed on a tiltable frame to which tilting means are added.

Such a device is known from EP-A-0269495.

In order to collect bags in a row and to deposit said row on a bearing surface or in a box without upsetting the position of the bags relative to each other, it is known to feed in the bags by means of a telescopic feed conveyor located directly above a bearing surface and deposit them in a row on said bearing surface by retracting of the conveyor. The bearing surface under the row of bags is then pulled away or pivoted away downwards. Such a known device is complex and takes up a large amount of space.

A device with two conveyor belts disposed on a tiltable frame has very few or none of these disadvantages.

The two conveyor belts of the known device according to EP-A-0269495 have their own drive shaft extending parallel to the lengthwise direction of the conveyor belts and connected via a transmission comprising two conical gears to a roller shaft of a conveyor belt. The transmission of each conveyor belt is accommodated in a box which can be tilted along the central axis of the corresponding drive shaft. The frame of each conveyor belt is connected to such a box and tilts with said box. The drive of this known device is relatively expensive and complex. Moreover, the conveyor belts cannot be adjusted relative to the drive at right angles to their lengthwise direction.

The object of the invention is to eliminate this disadvantage, and for this purpose the drive for both conveyor belts comprises a drive pulley acting on the top part of the belts, in the conveying position thereof.

The bags can be deposited accurately overlapping on said conveyor belts and the frames of said belts can be tilted automatically after the row of bags is formed if the device is also provided with a feed conveyor which is located with its discharge end near the feed end of the tiltable conveyor belts, a first photoelectric cell being placed at the discharge end of the feed conveyor for indicating the presence of a bag to be fed onto the tiltable conveyor belts, while at the transition between the feed conveyor and the tiltable conveyor belts provision is made for a second photoelectric cell for the purpose of indicating that a bag has been deposited on the tiltable conveyor belts, said photoelectric cells being connected to a control unit for driving the tiltable belts and operating the tilting means, all this in such a way that the drive pulley of the tiltable conveyor belts is switched on if the first photoelectric cell has indicated that a bag has come past, and the drive pulley of the tiltable conveyor belts is switched off if the second photoelectric cell has indicated that a bag has arrived on said conveyor belts, while the control unit counts the number of bags indicated by a photoelectric cell and activates the tilting means when a specific number of bags have arrived on the tiltable conveyor belts.

If the second photoelectric cell is adjustable in the direction of conveyance of the feed conveyor, the overlap of the bags can be adjusted.

The invention will now be explained in greater detail with reference to the figures, in which an example of an embodiment is shown.

FIGS. 1 and 2 show a perspective view of the device, in the position in which a row of bags is formed, and in the position in which the row is deposited in a box, respectively.

The device shown comprises two conveyor belts 1 and 2 which are placed adjacent to each other and which can be driven by a pulley 3 which acts on the top part of the belts and is in turn driven by a motor B under the control of a control unit A. Each of the conveyor belts 1 and 2 has a frame 4 to which guide rollers 5 are fixed. The frame 4 is connected to a tilting lever 6, which is connected by means of a shaft 7 to a fixed part 8. A fluid pressure piston/cylinder assembly 9 extends between a fixed hinge point 10 and a rotary point 11 of the tilting lever 6 under the impetus of a source C of fluid pressure which is also under the control of control unit A.

A feed conveyor 12 is situated with its discharge end above the feed end of the conveyor belts 1 and 2 and is used for feeding in filled bags.

A photoelectric cell 13 on or near the discharge end of the feed conveyor 12 can indicate whether a rear side of a bag has passed the cell on its way to the conveyor belts 1 and 2. A photoelectric cell 14 on or near the feed end of the conveyor belts 1, 2 can indicate whether the rear side of a bag lying on the conveyor belts 1, 2 has passed the cell 14. The photoelectric cells 13 and 14 are also connected to control unit A which can switch the drive motor B of the pulley 3 and the drive motor of the driven pulley of the feed conveyor 12 on and off, and which can operate the valves of the fluid pressure source C to operate the piston/cylinder assemblies 9, for the purpose of extending and retracting the piston rods of the assemblies 9.

The device works as follows:

As soon as the rear side of a bag brought in on the feed conveyor 12 has passed the photoelectric cell 13, the drive motor of the pulley 3 is switched on, and is switched off as soon as the rear side of said bag has passed the photoelectric cell 14. In this way the bags can be deposited with a specific overlap in a row on the conveyor belts 1, 2. The control unit A counts the number of bags on the conveyor belts 1, 2 by establishing the number of times that the belts 1 and 2 are switched on and off. Once a particular number of bags are on the conveyor belts 1 and 2, the piston/cylinder assemblies 9 are operated, causing the belts 1, 2 to tilt from the horizontal position of FIG. 1 to the vertical position of FIG. 2. The row of bags thereby falls vertically into a box (or other collection surface) placed below the conveyor belts.

The photoelectric cell 13 is placed on the frame of the feed conveyor 12 so that it is adjustable in the direction of conveyance of said conveyor. The overlap of the bags on the conveyor belts 1, 2 can be changed by moving the photoelectric cell 13 in the lengthwise direction of the feed conveyor 12. Instead of using the photoelectric cell 13, the photoelectric cell 14 could have an adjustable position.

Various modifications and alternatives are possible within the scope of the invention.

I claim:

1. In a device for transferring objects, comprising a conveyor comprised of two conveyor belts disposed next to each other and having a conveying position in which said two conveyor belts form one conveyor face, tiltable frames on which said conveyor belts are disposed, and means for tilting said frames from an object-supporting position in which said conveyor belts are disposed in said conveying position and a position in which objects fall from said conveyor belts; the improvement comprising a driven pulley adapted to contact upper surfaces of said belts in said conveying position to drive said belts, and drive means for rotating said pulley.

2. A device as claimed in claim 1, and a feed conveyor for feeding objects to said conveyor belts, means to detect the presence of a said object on said feed conveyor thereby to actuate said pulley to drive said conveyor belts, and means to detect the presence of a said object on said conveyor belts thereby to stop said pulley when a said object has reached said conveyor belts.

3. A device as claimed in claim 2, and means to count the number of objects deposited by said feed conveyor on said conveyor belts and to tilt said tiltable frames when a predetermined number of said objects on said conveyor belts is thus counted.

4. A device as claimed in claim 2, said detecting means comprising photoelectric cells.

* * * * *